(12) United States Patent
Obasanjo et al.

(10) Patent No.: US 10,599,743 B2
(45) Date of Patent: *Mar. 24, 2020

(54) PROVIDING LOCALIZED INDIVIDUALLY CUSTOMIZED UPDATES FROM A SOCIAL NETWORK SITE TO A DESKTOP APPLICATION

(71) Applicant: Microsoft Technology Licensing, LLC, Redmond, WA (US)

(72) Inventors: Oludare Victor Obasanjo, Renton, WA (US); Paul Richard Chen Ming, Kirkland, WA (US); Deepa Chandramouli, Sammamish, WA (US); Jiahe Liu, Bellevue, WA (US); Austin Longino, Redmond, WA (US); Robert M. Dolin, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 221 days.

This patent is subject to a terminal disclaimer.

(21) Appl. No.: 14/108,046

(22) Filed: Dec. 16, 2013

(65) Prior Publication Data

US 2014/0108549 A1 Apr. 17, 2014

Related U.S. Application Data

(63) Continuation of application No. 12/143,873, filed on Jun. 23, 2008, now Pat. No. 8,635,248.

(51) Int. Cl.
*G06F 15/173* (2006.01)
*G06F 16/9535* (2019.01)
*G06F 16/958* (2019.01)
*G06Q 10/10* (2012.01)

(52) U.S. Cl.
CPC ........ *G06F 16/958* (2019.01); *G06F 16/9535* (2019.01); *G06Q 10/10* (2013.01)

(58) Field of Classification Search
CPC ........... G06F 15/17306; G06F 16/9535; G06F 16/958; G06Q 10/10
See application file for complete search history.

(56) References Cited

U.S. PATENT DOCUMENTS

| | | |
|---|---|---|
| 6,275,825 B1 | 8/2001 | Kobayashi |
| 7,117,254 B2 | 10/2006 | Lunt |
| 7,353,466 B2 | 4/2008 | Crane et al. |
| 7,620,697 B1 | 11/2009 | Davies |
| 7,669,123 B2 | 2/2010 | Zuckerberg |
| 7,673,327 B1 | 3/2010 | Polis |
| 7,698,380 B1 | 4/2010 | Amidon |

(Continued)

OTHER PUBLICATIONS

Ruchi Sanghvi, "Facebook Gets a Facelift" dated Sep. 5, 2006.

(Continued)

*Primary Examiner* — James Trujillo
*Assistant Examiner* — Hubert Cheung

(57) ABSTRACT

A method of providing updates from a social network to a desktop application is provided. An update is created in an application and if the application has permission, it creates an entry in a recent activity queue. The queue is then subject to analysis to reduce the number of entries in the queue. Subscribers that have permission to receive updates from the publisher and the publishing application then receive updates from the publisher.

20 Claims, 7 Drawing Sheets

(56) References Cited

U.S. PATENT DOCUMENTS

| | | |
|---|---|---|
| 7,860,852 B2 | 12/2010 | Brunner |
| 8,150,959 B1* | 4/2012 | Bezdicek ............ G05B 23/027 709/224 |
| 8,335,798 B2 | 12/2012 | Achlioptas |
| 8,346,807 B1 | 1/2013 | Diamond |
| 8,359,277 B2 | 1/2013 | Adebiyi |
| 8,635,248 B2 | 1/2014 | Obasanjo |
| 2002/0023230 A1 | 2/2002 | Bolnick |
| 2004/0002958 A1* | 1/2004 | Seshadri ........... G06F 17/30867 |
| 2004/0002988 A1* | 1/2004 | Seshadri ........... G06F 17/30516 |
| 2004/0024625 A1 | 2/2004 | Cohen |
| 2004/0122681 A1 | 6/2004 | Ruvolo |
| 2004/0224706 A1 | 11/2004 | Lorello |
| 2005/0160167 A1 | 7/2005 | Cheng |
| 2005/0165785 A1 | 7/2005 | Malkin |
| 2005/0177385 A1 | 8/2005 | Hull |
| 2005/0246421 A1 | 11/2005 | Moore |
| 2005/0267766 A1 | 12/2005 | Galbreath |
| 2005/0267940 A1 | 12/2005 | Galbreath |
| 2006/0095976 A1 | 5/2006 | Torres |
| 2006/0123053 A1 | 6/2006 | Scannell |
| 2006/0242663 A1 | 10/2006 | Gogerty |
| 2006/0284787 A1 | 12/2006 | Bear et al. |
| 2007/0006727 A1 | 1/2007 | Gysling |
| 2007/0067392 A1 | 3/2007 | Torres |
| 2007/0106698 A1 | 5/2007 | Elliott |
| 2007/0156434 A1 | 7/2007 | Martin |
| 2007/0156805 A1 | 7/2007 | Bristol |
| 2007/0282877 A1 | 12/2007 | Fischer |
| 2008/0016446 A1 | 1/2008 | Aonuma |
| 2008/0040673 A1 | 2/2008 | Zuckerberg |
| 2008/0189189 A1 | 8/2008 | Morgenstern |
| 2008/0256170 A1 | 10/2008 | Hayashi |
| 2009/0049030 A1* | 2/2009 | Svendsen .......... G06F 17/30053 |
| 2009/0055355 A1 | 2/2009 | Brunner |
| 2009/0070412 A1 | 3/2009 | D'Angelo |
| 2009/0083177 A1* | 3/2009 | Lutnick .................. G06Q 20/10 705/39 |
| 2009/0144392 A1 | 6/2009 | Wang |
| 2009/0176518 A1* | 7/2009 | Doni ....................... H04W 4/12 455/466 |
| 2009/0198487 A1 | 8/2009 | Wong |
| 2009/0271493 A1* | 10/2009 | Boucard ................ G06Q 30/02 709/213 |
| 2009/0287781 A1* | 11/2009 | Newcomb, Jr. ......... G06F 9/546 709/206 |
| 2010/0127921 A1 | 5/2010 | Chen |
| 2010/0146443 A1 | 6/2010 | Zuckerberg |
| 2011/0219036 A1 | 9/2011 | Aldrich |
| 2011/0225293 A1* | 9/2011 | Rathod ............ G06F 17/30867 709/224 |
| 2012/0041819 A1 | 2/2012 | Ramer |
| 2012/0271706 A1* | 10/2012 | Ransom ................ G06Q 30/02 705/14.36 |
| 2013/0066823 A1 | 3/2013 | Sweeney |
| 2013/0097245 A1* | 4/2013 | Adarraga .............. H04L 65/403 709/204 |

OTHER PUBLICATIONS

Mark Slee, "What's Everyone Up To?" dated Apr. 20, 2007.
Chad Little, "Facebook in Translation" dated Jun. 23, 2008.
James Wang, "News Feed Just Got Better" dated Nov. 15, 2006.
Tom Whitnah, "News Feed Feedback" dated Nov. 21, 2007.
Duavis Timothy Joseph "Desktop Social Networking Integration", pp. 1-12. (Retrieved Apr. 18, 2008) http://zenit.senecac.on.ca/wiki/index.php/Desktop_Social_Networking_Integration#Project_Description.
Greenberg, The Notification Collage: Posting Information to Public and Personal Displays, Proceedings of the SIGCHI conference on Human factors in computing systems, Date: 2001, pp. 514-521, ACM Press New York, NY USA.
Muntermann, "Enhancing Asynchronous User Communication with Cross Platform and Channel Agnostic Messaging Services", pp. 1-9, (Retrieved Apr. 18, 2008) http://64.233.179.104/scholar?hl=en&lr=&q=cache:Hw3Ctgr5PZoJ: research. microsoft.com/users/natasamf/publications/SIGEBIZ07-1590-jm.doc.

* cited by examiner

PROVIDING LOCALIZED INDIVIDUALLY CUSTOMIZED UPDATES FROM A SOCIAL NETWORK SITE TO A DESKTOP APPLICATION

RELATED APPLICATIONS

This Application is a Continuation of and claims benefit from U.S. patent application Ser. No. 12/143,873 that was filed, on Jun. 23, 2008, and that is incorporated, herein by reference in its entirety.

BACKGROUND

This Background is intended to provide the basic context of this patent application and it is not intended to describe a specific problem to be solved.

Social networks are increasing in popularity. As more and more people join social networks and create their own pages, keeping track of changes has become more and more complex. Some social network sites allow a user to sign in and, inquire if changes have been made to a particular page or site. However, this arrangement still requires a user to sign in and request the notification that a change has been made. The person that made the change can never be confident that all the intended recipients actually received the update.

SUMMARY

This Summary is provided to introduce a selection of concepts in a simplified form that are further described below in the Detailed Description. This Summary is not intended, to identify key features or essential features of the claimed subject matter, nor is it intended to be used to limit the scope of the claimed subject matter.

A method of providing updates from a social network to a desktop application is provided. An update is created in an application and if the application has permission, it creates an entry in a recent activity queue. The queue is then subject to analysis to reduce the number of entries in the queue. Subscribers that have permission to receive updates from the publisher and the publishing application then receive updates from the publisher. The subscriber can specify that the update be in a desired format, including a desired language. The update is delivered and then appears in an application on the subscriber's computing device.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
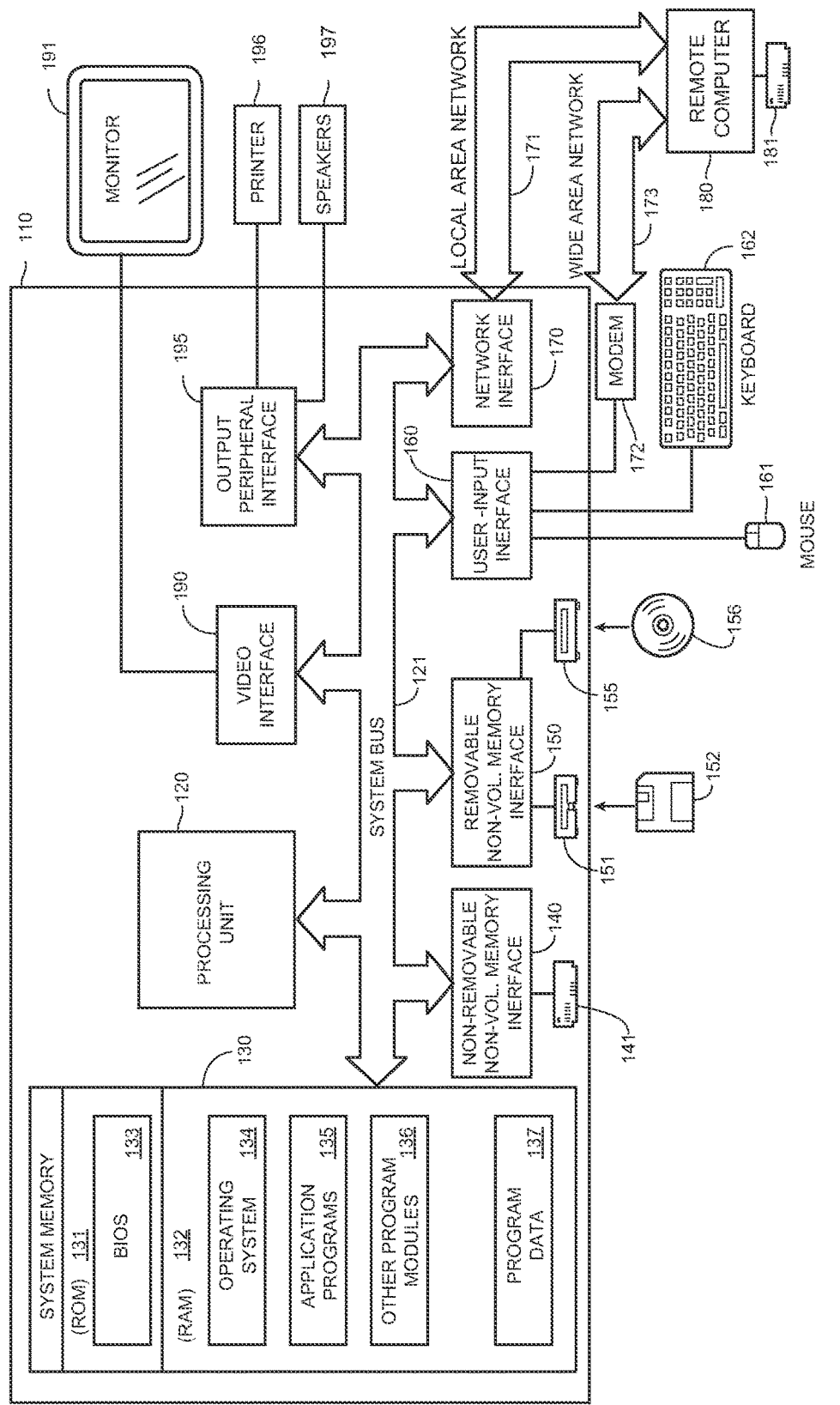
FIG. 1 is an illustration of a computing system that may be used to execute computer executable code according to the claims.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to a optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
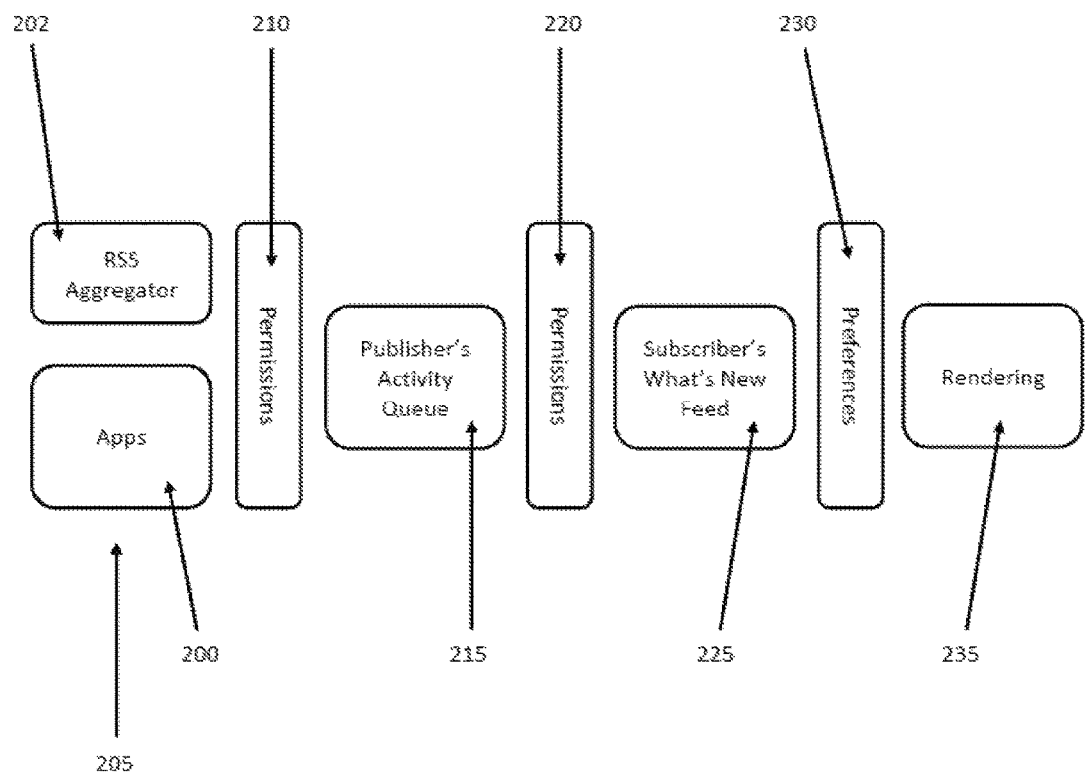
FIG. 2 is an illustration of a method of creating a notification of a change to a resource on a network.

FIG. 2 is another high level illustration of the system the flow of one of the several embodiments of a method of creating a notification of a change to a resource on a network in accordance with the claims. Of course, other permutations of the method are possible and are contemplated. Applications (block 200) and RSS aggregators (block 202) create updates 205 when changes occur in applications 200 of from other sources that provide RSS feeds 205, such as news sites, sports sites, etc. These updates 205 are reviewed in view of the application's 200 and. RSS feed's permission 210 to modify the publisher's activity queue 210. If the application 200 and/or RSS feed 205 have permission 210 to modify the publisher's recent activity queue 210, then the update 205 is added to the publishers' recent activity queue 215. At block 220, the permissions 225 of the subscribers is reviewed, if the subscriber has permission 220 to receive the update, then the update 205 is added to the subscriber's what's new feed 225. Using metadata included in the update, the subscriber's preference 230 are determined such as a preferred language and the update 205 is rendered 235 on the subscriber's computing device. The application may be an application that starts at boot-up and receives pushed updates without having to request the updates. The updates may appear in any manner to notify the senses of a user.

Figure 3:
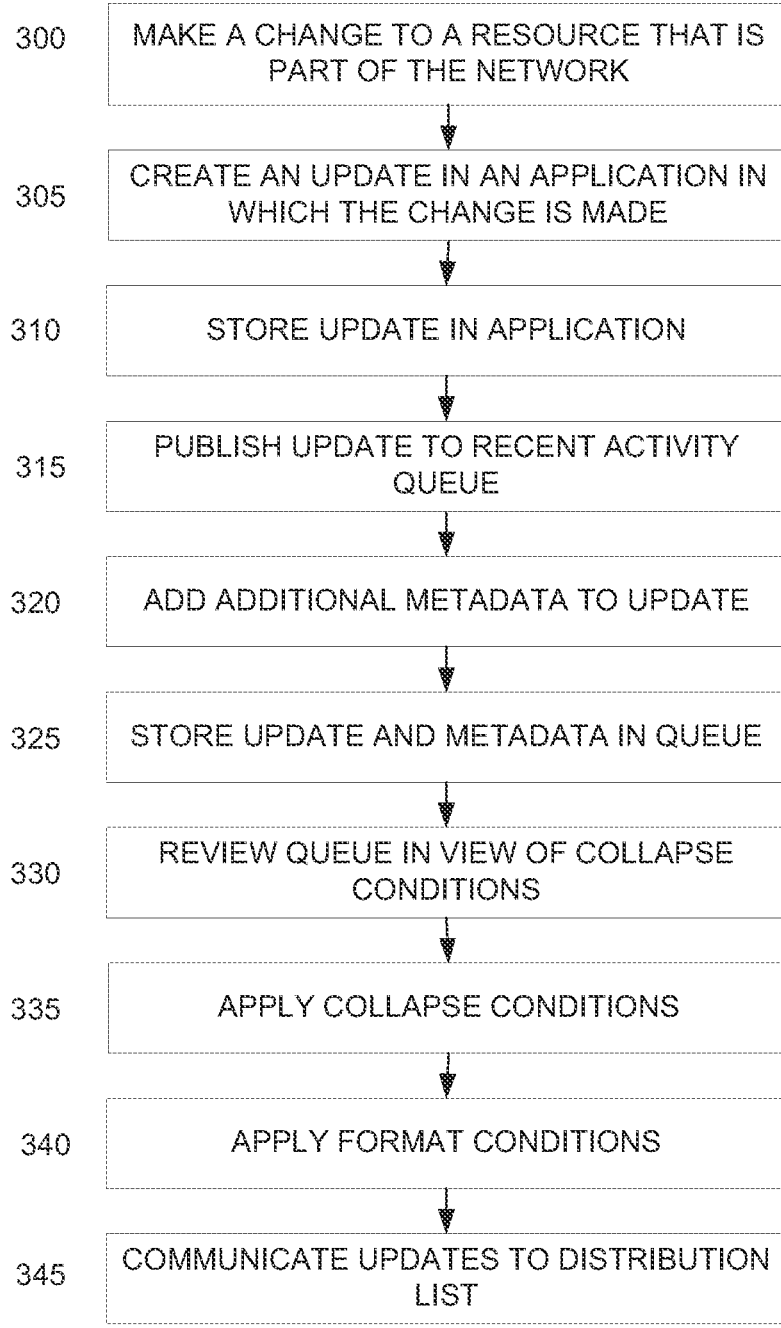
FIG. 3 is an illustration of some of the elements that may be included in the update.

FIG. 3 is an illustration of a method of creating a notification of a change to a resource on a network. The network may be any network, such as a social network where friend interact online. The notification may take on virtually any thrill such that it will be noticed by one of the five human senses. In one embodiment, the notification is to a separate application operating on a computing device, such as computing device 100. In such a case, the user does not have to be signed in to the social network to receive updates from other users on the social network.

At block 300, a change may be made to a resource that is part of the network. The resource may be any item that is part of a network, such as adding a photo to a website, adding new text to a web site, adding new media files to a web site, adding a new music file, new blog entry, etc.

At block 305, an update may be created in an application to be communicated to a distribution list. The application may publishes changes on behalf of a user. Sample publishing application may include applications such as photo sharing sites, instant messaging applications, a file sharing application, etc.

The publisher may send out updates about their actions to their subscribers via a publishing application which pushes updates to the publisher's recent activity queue. These updates may be in turn fanned out to the subscribers who have access to the resource that was the subject of the update. A publisher could opt out of sending updates per publishing application. Additionally, a publisher could only be an individual user. A user may explicitly grant or deny a publishing application permission to write to their personal recent activity list and fan out to their social network. Some applications may be able to publish on a user's behalf without having to explicitly be granted permission. Other publishing applications may require explicit permission from the user before they can publish to their recent activity queue. In either case, a publisher can revoke permission to publish on their behalf from an application. Additionally, a publisher can be an individual user or a group (i.e. affinity group to which the user belongs).

The distribution list may be created in a variety of ways. In one embodiment, the distribution list is an intersection of a provided list of subscribers to be notified and a list of users that have access to the resource. Subscribers may receive updates from another user in their "What's New" feed. In addition, subscribers may choose to opt-in to receive updates from a publisher by making the person a friend/buddy. Opt in may also occur by joining a "group" or other named social network such as alumni of a college or former employees of an employer. Subscribers may opt-out of updates by blocking the publisher while remaining a friend/buddy. A subscriber may be able to opt out of receiving publishing updates by publishing application as well as by publisher. The distribution list may be modified by the publisher.

Logically, the distribution list contains users that have permission to access the resource. For example, a sports team may post diagrams of new plays for team members. Members of other teams may not have permission to access or view the diagrams while members of the team may have permission to view the diagrams. The distribution list may contain subscribers that have opted in to receive updates from the resource. For example, Grandparents may opt in to receive photo updates of their grandchildren but the grandparents may not opt in to receive work related blog updates from the parents.

Multiple permission lists may exist. For example, a first permission list may be created in a photo sharing application and a second list may exist for a blogging application. If a new photo is added to a blog, a publisher may desire to have the new photo distributed to subscribers of the blog and subscribers of photo sharing application. The method may interface with both applications and ensure that everyone with permission to see updates related to photos receives the update regarding the recently added photos.

At block 310, the update may be created in the application. The update may be a small data file such as an indication that may update data is available, or may be lame in that it may contain a significant amount of update data. The update may be in a standard format such that the application on the computing device will be able to easily understand the data.

At block 315, the application may be used to publish the update from block 310 to a recent activity queue. The Recent Activity queue may be a reverse chronological list of the last n recent activity items that represent actions the publisher has taken on the network. Each item in this queue has a reference to an access control list that determines who has permission to view the item. This queue may be populated by publishing applications that have been granted permission by the publisher.

The recent activities may be added to a "what's new" queue. There may be rules associated is moved from the recent activity queue to the what's new queue: The what's new queue may be a reverse chronological list of the last n items representing activities by the subscriber's social network. To prevent one publisher dominating the subscriber's queue, each of the publishers only gets a certain number of slots in the queue. In one embodiment, the number of slots is limited to five, but the number is variable based on a variety of factors such as the number of applications, the number of publishers, etc. The number also may be user adjustable. In addition, to prevent one application from overwhelming the publisher's slots, each publishing application may only receive a number of slots. In one embodiment, the publishing application gets two slots but again, the number of slots is variable based on a variety of factors. The number of slots also may be set by a user. So if a publisher changes their Messenger PSM four times, posts a blog entry and upload photos to two photo albums then there will be two PSM changes, one blog entry and two photo album updates for the publisher in each of his subscribers' "What's New" queues.

In some embodiments, a provider may be able to remove an update from the queue. For example, an uploaded photo may be the wrong photo and the publisher may want to remove the update. In addition, by removing the update from the queue, it also may be removed, from some or all of the subscriber computing devices that have subscribed to the update or have the update in the queue. In another embodiment, the update is removed from every feed the next time the feed is requested.

Figure 4:
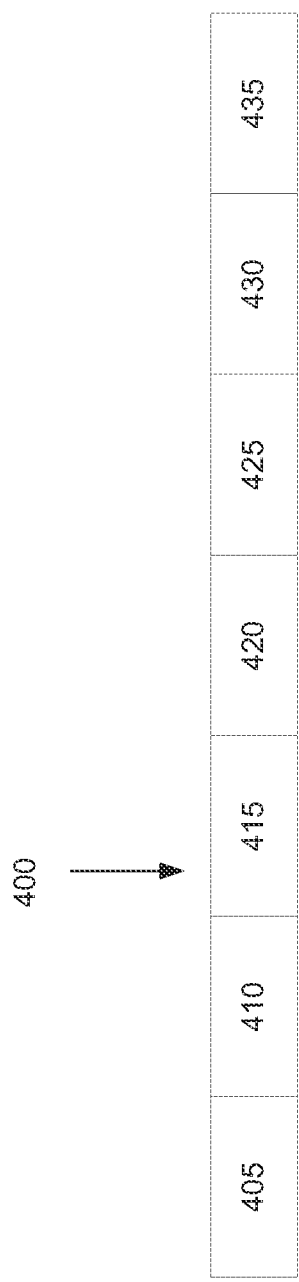
FIG. 4 is an illustration of some elements that may be included as part of the metadata.

The update may include a variety of elements. FIG. 4 is an illustration of some of the elements that may be included in the update 205. An identifier 405 of the application may be included. The identifier may be a code or the name of the actual application. An identifier for a publisher 410 may also be included. As previously mentioned, the publisher 410 pushes the updates to a subset of subscribers such as the subset that have opt to receive updates from the publisher 410. The subset is configurable.

A reference to a list or queue of the subscribers 415 who should receive the update 205 may also be included. The reference may be a code or a location at which the list may be obtained. A reference to a list of users who have access to the resource 420 may be included. The reference may be a code or a location at which the list may be obtained. Again, users may have to have access to a resource before they can receive updates about the resource.

Data related to the update 205 to the resource being added to the queue 425 may be included. The data may be virtually any data. In one embodiment, the data contains a significant amount of information about the update 205 including the updated, item. In another embodiment, the data is simply a code that indicates some information about the data. In another embodiment, the data is a part of a PKI hash system. In another embodiment, the data is a location which additional information may be obtained.

A reference to a template 130 that should be used to determine how to render the update 205 may also be included. A variety of templates may be available to help illustrate the update. Some templates may use scripts and the template may indicate the scripts and templates that may be used to render the update. In another embodiment, the template itself is included. In another embodiment, the template reference is a location at which the template may be accessed.

Figure 5:
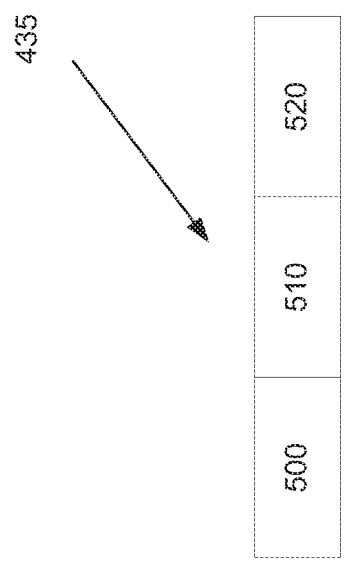
FIG. 5 illustrates a sample collapse condition analysis.

Referring again to FIG. 2, at block 320 additional metadata 435 (FIG. 4) may be added as an object to the update 205. The additional metadata 435 may include data about the update 205 that would be useful to a subscriber. FIG. 5 is an illustration of some elements that may be included as part of the metadata 435.

One possible metadata piece is action data 500. The action data 500 may describe an action that caused the update, such as a new blog entry or a new photo being added to a photo sharing web site. Block 510 may be description data. The description data may provide a brief description of the update 205 such as "video of John's first home run" or "blog entry on 2012 election winner revealed." Block 520 may contain data that may provide a textual summary of the update. The textual summary may contain additional data that describes the update 205 such that it may be easier to search for the update. For example, searching for a particular video using current tools may be a challenge as most searches are text based. By providing a detailed description, the video may be located in a much faster fashion.

Referring again to FIG. 3, at block 325 the update 205 and metadata 435 may be stored in a queue for distribution to the distribution list. The distribution list may contain subscribers that selected to receive the update 205 and have permission to receive the update. In some embodiments, past, present and future updates are stored in a memory and are searchable by a user.

Figure 6:
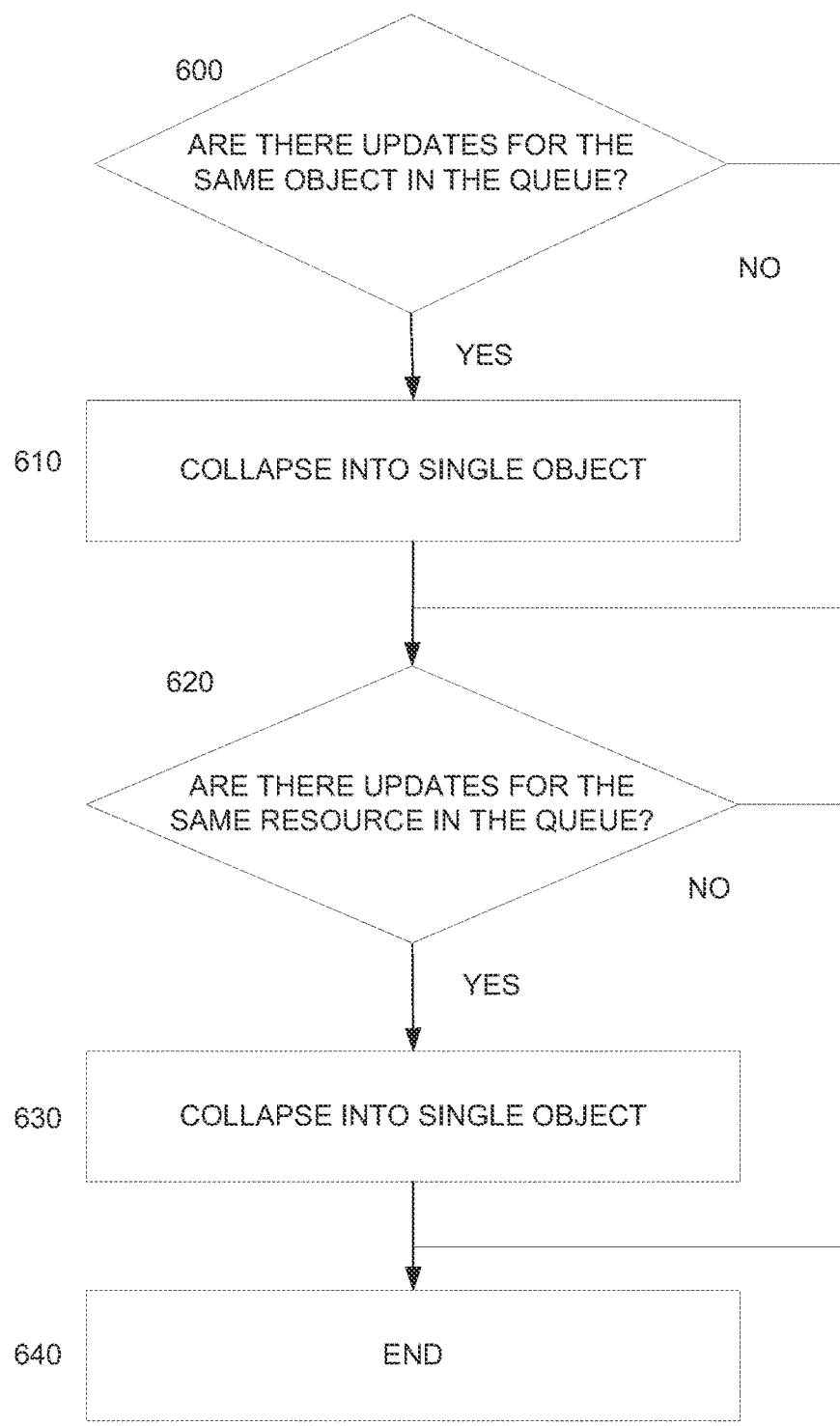
FIG. 6 illustrates the method from the subscribers perspective.

At block 330, the queue may be reviewed in view of one or more collapse conditions. At block 335, if elements in the queue match collapse conditions, collapsing the queue in accordance with the conditions. FIG. 6 illustrates a sample collapse condition analysis. The concept behind the collapse condition is to reduce the number of updates using logic. For example, if a photo was updated and then updated again shortly thereafter, it makes sense to only send a single update 205 rather than two updates. In addition, multiple updates by the same person could be collapsed into a single update 205 of that person.

In many cases, the people in a user's social network may perform the same activity in a short time frame. In such cases, a rendering application may want to collapse multiple events into a single line item in the user experience. For example CONVERTING
Dare is friends with Paul
Inder is friends with Paul
TO
Dare & Inder are friends with Paul
CONVERTING
Dare is friends with Paul
Inder is friends with Paul
Vanesa is friends with Pail
to
Dare, tinder and others are friends with Paul
or to
3 of your friends are friends with Paul So how does a rendering application know if and how it should collapse various arbitrary recent activity types? This is done using a CollapseCondition. Each change type has an optional CollapseCondition. The CollapseCondition is a list of macros whose values have to be equal before an item can be collapsed. In the example above, the template for the Title would be {publisher-id} is friends with {target-id}

The CollapseCondition for this recent activity item is target-id. If the {target-id} of multiple instances of the same change type are equal, then they can be collapsed together. The {list} macro is not allowed to be used as a collapse condition.

Each template returned for a change type has a Cardinality which can be one of three values {one, two or many}. If the collapse condition for a particular change type is met, the affected change types can be replaced with templates for that change type with a higher cardinality. The following examples, show what templates for the previous example would look like at cardinality two and many.

TWO: {publisher-id} and {publisher-id} are friends with {target-id}

MANY: {publisher-id}, {publisher-id} and others are friends with {target-id}

MANY: {sum=publisher-id} of your friends are friends with {target-id}

Of course, these are example collapse conditions and other collapse conditions are possible.

At block 600, the queue may be reviewed to determine if any updates in the queue to an object have been superseded with newer updates to the object. If the answer is yes, at block 610, the older update 205 to the object is replaced by the newer update 205 to the object and control may pass to block 620. If the answer is no, then control may pass to block 620.

At block 620, the queue may be reviewed to determine if any updates in the queue to a resource have been superseded with newer updates to the resource. If the answer is yes, at block 630, the older update 205 to the resource is replaced by the newer update 205 to the resource and control may pass to block 640. If the answer is no, then control may pass to block 640.

At block 640, the queue may be reviewed to determine if there is more than one entry per resource. If the answer is yes, at block 650, the multiple entries per resource are combined into a single entry and control may pass to block 660. If the answer is no, control may pass to block 660 and the method may end. In some embodiments, the collapsing is only done on the object server side where only n items per resource (Application ID) may be permitted in the user's queue.

Of course, additional collapse conditions can be created and are contemplated. Queue rules may relate to what data is added to the queue. For example, the data is added to the queue such that no queue will have no more than a maximum number of entries. In one embodiment, the maximum is 100, but other maximums are possible and are contemplated based on network capacity, bandwidth, etc. Another potential rule may be that no contact will have more than a threshold number of entries in the queue. Again, five is an arbitrary number for the threshold and the number may vary based on the size of the queue, the number of subscribers, the number of resources, etc. Related, there may be a rule that entries are not added to the queue where the owner of the address book is listed as the initiator of the change. In other words, the person that made the change will not receive notice of the change as presumably, the initiator of the change is aware that the change was made.

The collapse conditions may be modifiable by the publisher and in another embodiment, the collapse conditions may be modifiable by the subscriber. In addition, the method may attempt to learn from subscribers by requesting response from the subscribers to the updates and learning which updates are viewed and for how long, which updates are deleted, which updates are completely ignored, etc. By gathering this information (with the subscriber's permission) the updates can be better tailored to meet the interests of the subscriber.

At block 340, format conditions may be applied. In some embodiments, a response may be received from the subscriber's computing device where the response includes data that represents supported formats. The supported formats make take on a variety of forms. In one embodiment, the format may related to languages supported by the subscriber's remote computing device. For example, a subscriber may speak French and the publisher may publish the updates in English, French and German. By receiving the requested format, the publisher may know to communicate the update 205 in the desired language. In another embodiment, the publisher may recognize that the update 205 in a first language needs to be converted to a second language. The method may then communicate the update 205 in the first language to a translation application and to the subscriber in the second language.

The format may also relate to the data form that the subscriber can support. For example, some subscribers may desire to receive updates in HTML format while others may desire XML. The format also may relate to style sheets that are and are not supported by the subscriber's remote computing device. Still others may receive updates as text files as the subscriber's remote computing device may be a mobile telephone or another device that has limited format options. In response to receiving the requested format from the subscriber, the publisher may supply the update 205 in a format requested or in a compatible format to the format requested.

For example, lees say the "Windows Live Loaned Book Tracker" application has been added to the feed. When the application is registered, it is specified that the application has two notifications with change type 1 and change type 2 that support two languages.

Change Type 1—en
Title: {publisher-id} has borrowed a book from {target-id}
Body: {text:book-title}—{image:book-cover}|{hlink:add-url"Add book to wishlist"}
Change Type 1—fr
Title: {publisher-id} a emprunté un livre à {target-id}
Body: {text:book-title}—{image:book-cover}|{hlink:add-url"Ajoutez le livre à la liste de souhait"}
Change Type 2—en
Title: {publisher-id} has returned a book to {target-id}
Body {text:book-title}—{image:book-cover}
Change Type 2—fr
Title: {publisher-id} a renvoyé un livre à {target-id}
Body {text:book-title}—{image:book-cover}

When the publishing application publishes an new item to the user's recent activity feed, it passes along some parameters. It may pass
  (i) The change type of the item and its application ID
  (ii) the actor's id {aka CID of the person making the change}
  (iii) target ids {a list of one or more CIDs affected by the change}
  (iv) other system IDs such as {image:book-cover} which point to thumbnail images to be placed in the feed (i.e. replace them with <img> tags
  (v) application specific variables (e.g. text:book-title in the example above is the title of the book)

After the feed is retrieved, the rendering application should request the templates to render the items it is interested in. The following parameters may be passed to a distribution application when retrieving the templates
  (i) the locale of the viewer
  (ii) the change type and application IDs of the templates needed In some embodiments, it should be noted that the templates could optionally be returned along with the feed instead of needing two requests. In another embodiment, the update 205 may contain public information updates such as news feeds, sports scores and other available information of interest to the subscriber.

The form of the update 205 also may take on a variety of forms. As previously mentioned, the form may be HTML or XML. In another embodiment, the update 205 is a media file, such as a jpeg file, mpeg file or a gif file. The update 205 may contain virtually any file of virtually any type or combination of types.massive Returning again to FIG. 3, at block 345, the update 205 may be communicated to the distribution list. In some embodiments, the method ends. In other embodiments, the publisher may ask for feedback from the subscriber and the updates may be adjusted in the future based on the feedback received.

In some embodiments, the update 205 is matched to a relevancy condition. A relevancy condition may be similar to a list of the subscribers interests. The relevancy condition may be created by specifically asking a subscriber to specify interests. In another embodiment, the relevancy condition may evolve based on responses of a subscriber, a group of similar subscribes or all the subscribers to updates. The update 205 may be communicated to members of the distribution list that match the relevancy condition.

In some embodiments, advertisements may be added to the updates. The advertisements may be matched to a relevancy condition and the advertisements that are added match the relevancy condition. The relevancy condition may be the same as the relevancy condition discussed previously or may be a separate relevancy condition.

In some embodiments, a subscriber name may be application specific. For example, a subscriber in Flickr may be BearsFan08 and a subscriber to Facebook may be BearsFan. The method may match the subscriber names from a first application to a subscriber name from a second application. In this way, it may be easier to track whether a particular subscriber has received an update 205 or whether a particular subscriber has received the same update 205 multiple times.

Figure 7:
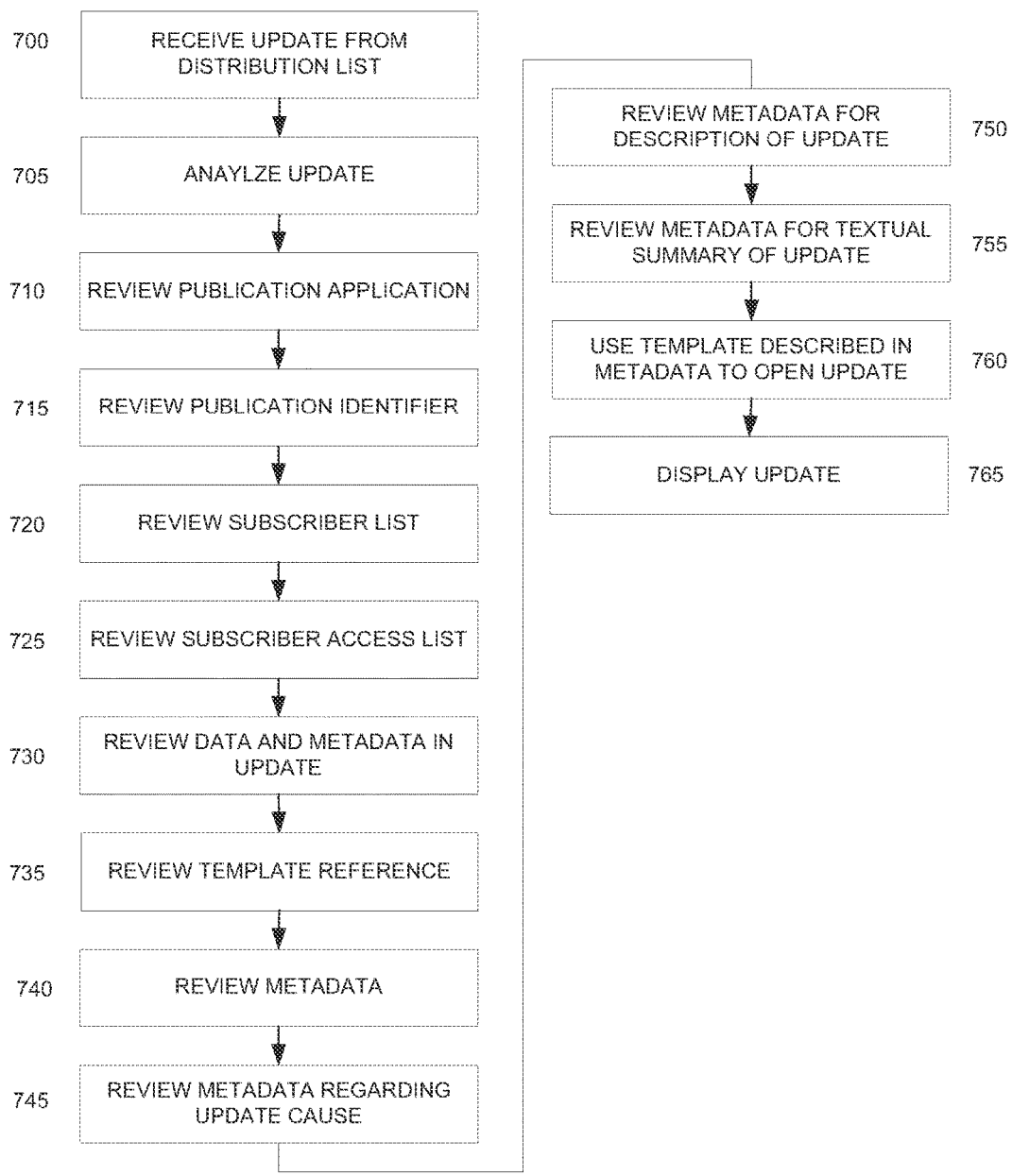
FIG. 7 is another high level illustration of the system the flow of one of the several embodiments of a method in accordance with the claims.

The method may be similar from a subscribers point of view. FIG. 7 illustrates the method from the subscribers perspective. At block 700, an update 205 may be received from a distribution list. The distribution list is created in a similar manner as described previously. In addition, the update 205 may be news, media files, advertisements, etc. The list may be sorted based on relevancy to the subscriber's interests. At block 705, the update 205 may be analyzed. At block 710, an identifier of the publishing application may be reviewed. At block 715, an identifier for the publisher may be reviewed. At block 720, a reference to a list of subscribers who should receive the update 205 may be reviewed. At block 725, a reference to a list of users who have access to the resource may be reviewed. At block 730, data and metadata of the recent activity update 205 being added to the queue may be reviewed. At block 735, a reference to a template that should be used to determine how to render the recent activity item may be reviewed.

At block 740, metadata attached to the update 205 as an object may be reviewed. The metadata review may include reviewing data that describes an action that caused the update 205 (block 745), data that provides a description of the update 205 (block 750) and data that provides a textual summary of the update 205 (block 755). At block 760, the appropriate template to open the activity item may be used. The template may suggest a format where the format is a language. Publishing applications will have the ability to declare how consumers of the feed should render their content types. Thus when a new publishing application or content type is added to the What's New feed, the knowledge of how to render it will be added as well. At block 665, the update 205 on the desktop application using the template may be displayed. The updates may be stored in a memory and searched. Similar to the previous section, the network may be a social network.

The invention claimed is:

1. A method performed on at least one computing device, the method comprising:
  receiving, by the at least one computing device from multiple publishers, updates that, as received, each comprise a variety of elements that include a first identifier and a second identifier, wherein the first identifier identifies a publisher that published the each update and a reference to subscribers to the each update, wherein the second identifier identifies an application, and where the received updates originate from the multiple publishers;
  reducing, by the at least one computing device, a number of the updates based on a plurality of collapse conditions that comprise:
    a first collapse condition comprising a plurality of the updates that are directed to a common subscriber as indicated by the references to the subscribers, where the reducing based on the first collapse condition comprises collapsing the plurality of updates directed to the common subscriber into a single update based at least in part on the common subscriber; and
    a second collapse condition comprising a plurality of the updates published by a common publisher as indicated by the first identifier of each of the publishers, where the reducing based on the second collapse condition comprises collapsing the plurality of updates published by the common publisher into the single update based at least in part on the common publisher; and
  the method further comprising communicating, by the at least one computing device, instructions to display the single update on a display device.

2. The method of claim 1 where at least one of the updates identifies a social network.

3. The method of claim 1 further comprising formatting an update in a format desired by a subscriber to the update.

4. The method of claim 1 further comprising converting an update from a first human language to a second human language.

5. The method of claim 1 where the reducing comprises limiting a quantity of the updates:
  from a particular publisher;
  that correspond to a particular common resource; or
  by a common user.

6. The method of claim 1 where each of the updates corresponds to a resource, or where the collapse conditions further comprise a third collapse condition comprising a plurality of the updates that correspond to a common resource.

7. The method of claim 1, wherein the application is the publisher.

8. At least one computing device comprising:
a network interface via which the computing device receives, from multiple publishers, updates that, as received, each comprise a variety of elements that include a first identifier and a second identifier, wherein the first identifier identifies a publisher that published the each update and a reference to subscribers to the each update, wherein the second identifier identifies an application, and where the received updates originate from the multiple publishers;
a processing unit via which the computing device reduces a number of the updates based on a plurality of collapse conditions; and
memory that comprises the collapse conditions, where the collapse conditions comprise:
a first collapse condition comprising a plurality of the updates that are directed to a common subscriber as indicated by the references to the subscribers, where reducing based on the first collapse condition comprises collapsing the plurality of updates directed to the common subscriber into a single update based at least in part on the common subscriber; and
a second collapse condition comprising a plurality of the updates published by a common publisher as indicated by the first identifier of each of the publishers, where the reducing based on the second collapse condition comprises collapsing the plurality of updates published by the common publisher into the single update based at least in part on the common publisher; and
the network interface via which the computing device communicates instructions to display the single update.

9. The at least one computing device of claim 8 where at least one of the updates identifies a social network.

10. The at least one computing device of claim 8 further comprising the processing unit via which the computing device formats an update in a format supported by a subscriber to the update.

11. The at least one computing device of claim 8 further comprising the processing unit via which the computing device converts an update from a first human language to a second human language.

12. The at least one computing device of claim 8 where the updates are reduced based on limiting a quantity of the updates:
from a particular publisher;
that correspond to a particular common resource; or
by a common user.

13. The at least one computing device of claim 8 where each of the updates corresponds to a resource, or where the collapse conditions further comprise a third collapse condition comprising a plurality of the updates that correspond to a common resource.

14. The at least one computing device of claim 8, wherein the application is the publisher.

15. At least one computer storage device storing computer-executable instructions that, when executed by at least one computing device, cause the at least one computing device to perform actions comprising:
receiving, by the at least one computing device from multiple publishers, updates that, as received, each comprise a variety of elements that include a first identifier and a second identifier, wherein the first identifier identifies a publisher that published the each update and a reference to subscribers to the each update, wherein the second identifier identifies an application, and where the received updates originate from the multiple publishers;
reducing, by the at least one computing device, a number of the updates based on a plurality of collapse conditions that comprise:
a first collapse condition comprising a plurality of the updates that are directed to a common subscriber as indicated by the references to the subscribers, where the reducing based on the first collapse condition comprises collapsing the plurality of updates directed to the common subscriber into a single update based at least in part on the common subscriber; and
a second collapse condition comprising a plurality of the updates that published by a common publisher as indicated by the first identifier of each of the publishers, where the reducing based on the second collapse condition comprises collapsing the plurality of updates published by the common publisher into the single update based at least in part on the common publisher; and
the actions further comprising communicating, by the at least one-computing device, instructions to display the single update.

16. The at least one computer storage device of claim 15 where at least one of the updates identifies a social network.

17. The at least one computer storage device of claim 15, the actions further comprising formatting an update in a format supported by a subscriber to the update.

18. The at least one computer storage device of claim 15 where the reducing comprises limiting a quantity of the updates:
from a particular publisher;
that correspond to a particular common resource; or
by a common user.

19. The at least one computer storage device of claim 15 where each of the updates corresponds to a resource; or where the collapse conditions further comprise a third collapse condition comprising a plurality of the updates that correspond to a common resource.

20. The at least one computer storage device of claim 15, wherein the application is the publisher.

* * * * *